(12) United States Patent  (10) Patent No.: US 6,985,423 B2
Sogawa  (45) Date of Patent: Jan. 10, 2006

(54) OPTICAL PICKUP DEVICE WITH DEFOCUS ADJUSTER

(75) Inventor: Teruaki Sogawa, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 406 days.

(21) Appl. No.: 10/326,256

(22) Filed: Dec. 23, 2002

(65) Prior Publication Data

US 2003/0123373 A1  Jul. 3, 2003

(30) Foreign Application Priority Data

Dec. 27, 2001 (JP) ............................. 2001-397746

(51) Int. Cl.
G11B 7/135 (2006.01)
(52) U.S. Cl. .............. 369/112.23; 369/120; 369/112.29
(58) Field of Classification Search ............. 369/44.14, 369/44.15, 44.16; 720/660, 672, 673, 674, 720/681, 685
See application file for complete search history.

(56) References Cited

U.S. PATENT DOCUMENTS 5,050,154 A * 9/1991 Shimozawa et al. ..... 369/44.14
6,693,870 B2 * 2/2004 Koga et al. ............... 369/44.14

FOREIGN PATENT DOCUMENTS

| JP | 63122023 A | * | 5/1988 |
| JP | 03023527 A | * | 1/1991 |
| JP | 04113525 A | * | 4/1992 |
| JP | 7-235059 |  | 9/1995 |
| JP | 9-198689 |  | 7/1997 |
| JP | 2000-293879 |  | 10/2000 |

OTHER PUBLICATIONS

Machine translation of Nakazato et al. (JP 07-235059).*

* cited by examiner

Primary Examiner—Hoa T. Nguyen
Assistant Examiner—Peter Vincent Agustin
(74) Attorney, Agent, or Firm—Morgan, Lewis & Bockius LLP

(57) ABSTRACT

In an optical pickup device with a defocus adjustor used for adjusting a position of a photo-sensor against an optical system, the photo-sensor is mounted on a flexible printed circuit board, and the flexible printed circuit board is fixed on a plate spring. A first end of the plate spring with the flexible printed circuit board is fixed on a fixing face of a holder. Since the fixing face of the holder is inclined and the plate spring is formed flat with no bending portion, the plate spring is warped for generating a stress when the second end of the plate spring is fixed on the holder by an adjusting screw. The position of a photo-sensing face of the photo-sensor can be fine adjusted by tightening or loosening the adjusting screw.

6 Claims, 6 Drawing Sheets

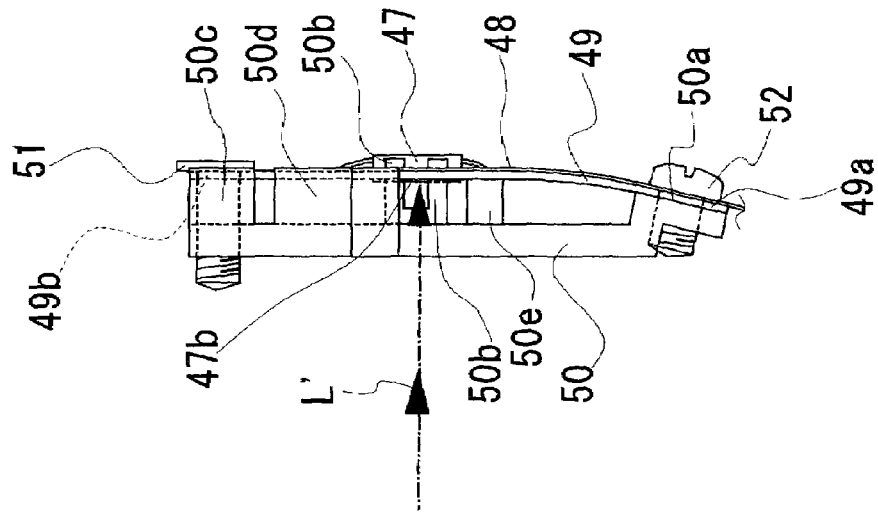
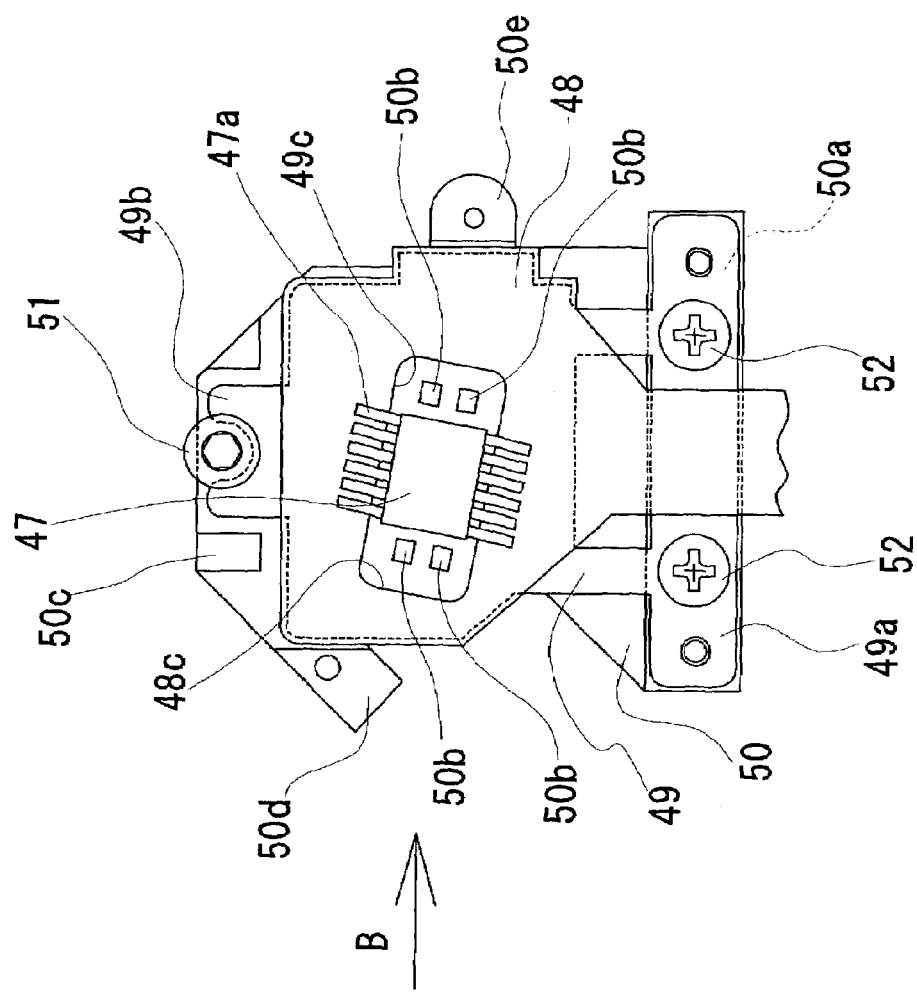

OPTICAL PICKUP DEVICE WITH DEFOCUS ADJUSTER

BACKGROUND OF THE INVENTION

1. Field of the Invention

The present invention relates to an optical pickup device used in an optical disc driving apparatus for recoding and reproducing data with respect to an optical disc, and especially relates to a defocus adjustor used for adjusting a position of a photo-sensor against an optical system in the optical pickup device.

2. Description of the Related Art

Many technologies are conventionally proposed for easing assembly and adjustment of an optical pickup device. In a conventional optical pickup device, for example, shown in publication gazette of Japanese patent application 9-198689, a flexible printed circuit board is used for connecting between a photo-sensor for sensing reflected laser beam from an optical disc and a controller for controlling the optical pickup device. The flexible printed circuit board is biased toward a holder of the optical pickup device by a plate spring.

In another conventional optical pickup device, for example, shown in publication gazette of Japanese patent application 2000-293879, a coupling hook for hooking a printed circuit board on which a photo-sensor is mounted is provided on a holder of the optical pickup device, so that the printed circuit board can easily be fixed on the holder.

In the optical pickup device, it is preferable that a photo-sensing surface of the photo-sensor is disposed corresponding to a focused position of the reflected laser beam and perpendicular to an optical axis of the reflected laser beam so as to increase the sensitivity of the photo-sensor. Thus, there is an optical pickup device having a defocus adjustor by which a position and an inclination of a photo-sensor can be adjusted precisely while an optical disc driving apparatus is assembled. A conventional optical pickup device, for example, shown in publication gazette of Japanese patent application 7-235059, comprises a fixing member having a U-shaped section for biasing a printed circuit board on which a photo-sensor is mounted toward an optical axis of a reflected laser beam, and an adjusting screw which is engaged with an end of the printed circuit board and is tightened on a holder. Defocus of the photo-sensor with respect to an optical system can be adjusted with using a spring effect of the fixing member due to tightening and loosening the adjusting screw.

Applicant has proposed an optical pickup device having a defocus adjustor (which is not known by publication). The optical pickup device with the defocus adjustor proposed by the applicant is described with reference to FIGS. 5, 6A, 6B, 7A and 7B.

The optical pickup device 100 comprises a laser diode 44 for emitting a laser beam L, a half mirror 45 for reflecting the laser beam L emitted from the laser diode 44 to an optical disc D and through which a reflected laser beam L' reflected by the optical disc D passes, a collimator lens 46a for expanding a diameter of the laser beam L and for converting the laser beam L to a parallel beam, a focusing lens 46b for focusing the laser beam L on a data recording face of the optical disc D, and a photo-sensor 47 for sensing the reflected laser beam L' reflected by the data recording face of the optical disc D.

FIGS. 7A and 7B show a configuration of the defocus adjustor and a method for adjusting the defocus. As can be seen from FIGS. 7A and 7B, the photo-sensor 47 is mounted on a flexible printed circuit board 48, and terminals 47a of the photo-sensor 47 are connected to circuit patterns on the flexible printed circuit board 48. The flexible printed circuit board 48 is bonded on a plate spring 101. A first end 101a of the plate spring 101 is fixed on a fixing face 102a of a holder 102 by screws 52, and a second end 101b of the plate spring 101 is adjustably fixed on the holder 102 by an adjusting screw 51.

The fixing face 102a of the holder 102 is formed on a plane substantially perpendicular to an optical axis of the reflected laser beam L'. The plate spring 101 is formed, for example, by punching and pressing a metal plate so as to have a bending portion 101c disposed between the end 101a and the position of the photo-sensor 47. When the first end 101a of the plate spring 101 is fixed on the fixing face 102a of the holder 102 by the screws 52 as shown in FIG. 7A, the position of the photo-sensor 47 of the plate spring 101 takes a state having a predetermined angle against the optical axis of the reflected laser beam L'. Subsequently, when the adjusting screw 51 is engaged with the second end 101b of the plate spring 101 and fixed on the holder 102 as shown in FIG. 7B, the plate spring 101 is warped to be straight, so that a photo-sensing surface 47b of the photo-sensor 47 becomes substantially perpendicular to the optical axis of the reflected laser beam L', which is suitable posture for sensing the reflected laser beam L'.

At this time, the plate spring 101 generates a stress against the tightening of the adjusting screw 51, which causes a spring effect suitable for adjusting the defocus of the photo-sensor 47 with respect to the optical system. Thus, when the adjusting screw 51 is excessively tightened, the position and inclination of the photo-sensing surface 47b of the photo-sensor 47 can be restored by loosening the adjusting screw 51 so that the defocus of the photo-sensor 47 can be fine adjusted.

The above-mentioned conventional optical pickup devices shown in the publication gazettes 9-198689 and 2000-293879, however, have no defocus adjustor, so that it is difficult to adjust the defocus of the photo-sensor. In the conventional optical pickup device shown in the publication gazette 7-235059, the bending angle of the U-shaped section of the fixing member can easily be varied in the manufacturing thereof. When the bending angle of the U-shaped section of the fixing member is varied, the spring effect of the fixing member becomes unstable, so that it is troublesome to adjust the defocus of the photo-sensor. Thus, the conventional optical pickup device is not suitable for mass production.

The optical pickup device proposed by the applicant and shown in FIGS. 5, 6A, 6B, 7A and 7B has a disadvantage that the bending angle of the plate spring 101 is easily be varied in the manufacturing thereof. When the bending angle of the plate spring 101 is varied, the spring effect due to the stress generated by the plate spring 101 against the tightening of the adjusting screw 51 becomes unstable. Thus, it becomes troublesome to adjust the defocus of the photo-sensor 47, so that the optical pickup device 100 proposed by the applicant is not suitable so much for mass production. Furthermore, it is impossible to bond the flexible printed circuit board 48 on the plate spring 101 by thermo compression with using a thermo compression roller, since the plate spring 101 has a bending portion 101c. Thus, the bond strength between the plate spring 101 and the flexible printed circuit board 48 becomes uneven.

SUMMARY OF THE INVENTION

An object of the present invention is to provide an optical pickup device with a defocus adjustor by which defocus of a photo-sensor against an optical system can easily be adjusted.

For attaining the above-mentioned object, an optical pickup device with a defocus adjuster in accordance with an aspect of the present invention comprises: a laser light source for emitting a laser beam; an optical system including a focusing lens for focusing the laser beam emitted from the laser light source on a data recording face of an optical disc; a photo-sensor for sensing a reflected laser beam reflected by the data recording face of the optical disc and for converting the reflected laser beam to an electric signal; a flexible printed circuit board on which the photo-sensor is mounted and having wiring patterns to which terminals of the photo-sensor are connected; a plate spring to which the flexible printed circuit substrate and used for adjusting a position of the photo-sensor against the optical system; a holder on which a first end of the plate spring is fixed; and an adjusting screw engaged with a second end of the plate spring and adjustably fixed on the holder.

The adjusting screw is tightened or loosened for adjusting the posture of the plate spring with the flexible printed circuit board with respect to the holder, so that a position of a photo-sensing surface of the photo-sensor against the optical system and an inclination of the photo-sensing surface against an optical axis of a reflected laser beam can be fine adjusted.

The plate spring is formed flat with no bending portion, and warped after fixing the first end and the second end of the plate spring on the holder. A fixing face of the holder is inclined against the optical axis of the reflected laser beam for giving a predetermined inclination angle to the plate spring with the flexible printed circuit board when the first end the plate spring is fixed on the fixing face of the holder. When the second end of the plate spring with the flexible printed circuit board is fixed on the holder by the adjusting screw, the plate spring is warped for generating a stress so that a spring effect can be obtained when the defocus of the photo-sensor against the optical system is adjusted.

By such a configuration, the position of the photo-sensing face of the photo-sensor against the optical system and the inclination angle of the photo-sensing face of the photo-sensor against the optical axis of the reflected laser beam from the optical disc can be adjusted by tightening or loosening the adjusting screw. Furthermore, the plate spring is formed flat with no bending portion in its natural state, so that the dimensions of the plate spring can be made stable and the stress generated by the plate spring against the tightening of the adjusting screw when it is warped can also be made stable. As a result, the defocus of the photo-sensor against the optical system can easily and quickly be adjusted. The defocus adjusting operation of the optical pickup device in mass production can be made effective.

BRIEF DESCRIPTION OF THE DRAWINGS

FIG. 3A is a bottom view of a defocus adjustor of the optical pickup device in accordance with the embodiment observed in a direction shown by arrow A in FIG. 2;

FIG. 3B is a side view of the defocus adjuster of the optical pickup device observed in a direction shown by arrow B in FIG. 3A;

DETAILED DESCRIPTION OF THE EMBODIMENT

An optical disc driving apparatus using an optical pickup device with a defocus adjustor in accordance with an embodiment of the present invention is described with reference to drawings.

Figure 1:
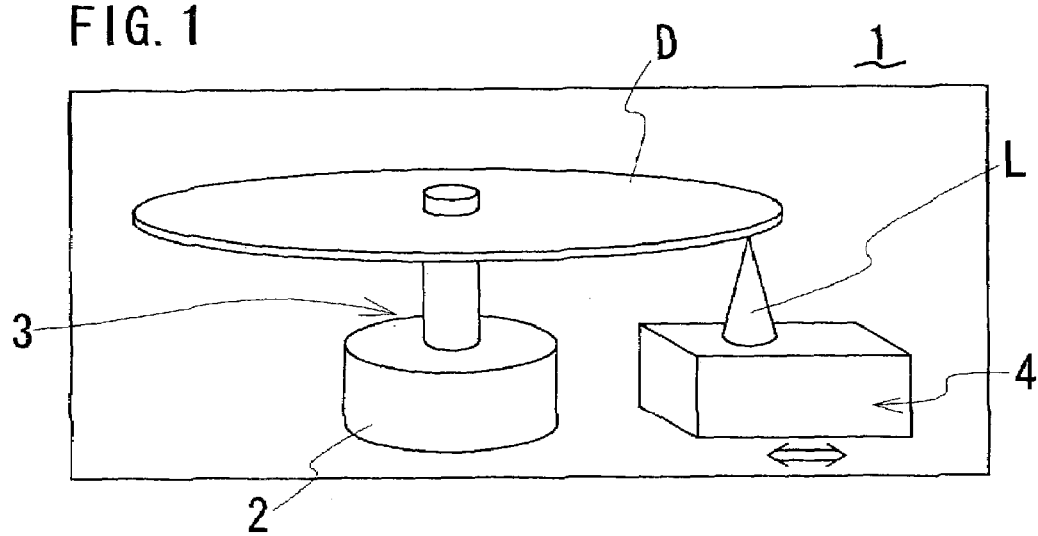
FIG. 1 is a perspective view for showing a schematic configuration of an optical disc driving apparatus using an optical pickup device.

FIG. 1 shows a schematic configuration of an optical disc driving apparatus 1. The optical disc driving apparatus 1 comprises a disc driving mechanism 3 including a motor for rotating an optical disc D loaded on the optical disc driving apparatus 1, and an optical pickup device 4 for emitting a laser beam L to the rotating optical disc D, for receiving a reflected laser beam from the optical disc D and for converting the reflected laser beam to an electric signal. The optical pickup device 4 is moved in a radial direction of the optical disc D by a driving mechanism (which will be described below with reference to FIG. 2).

Figure 2:
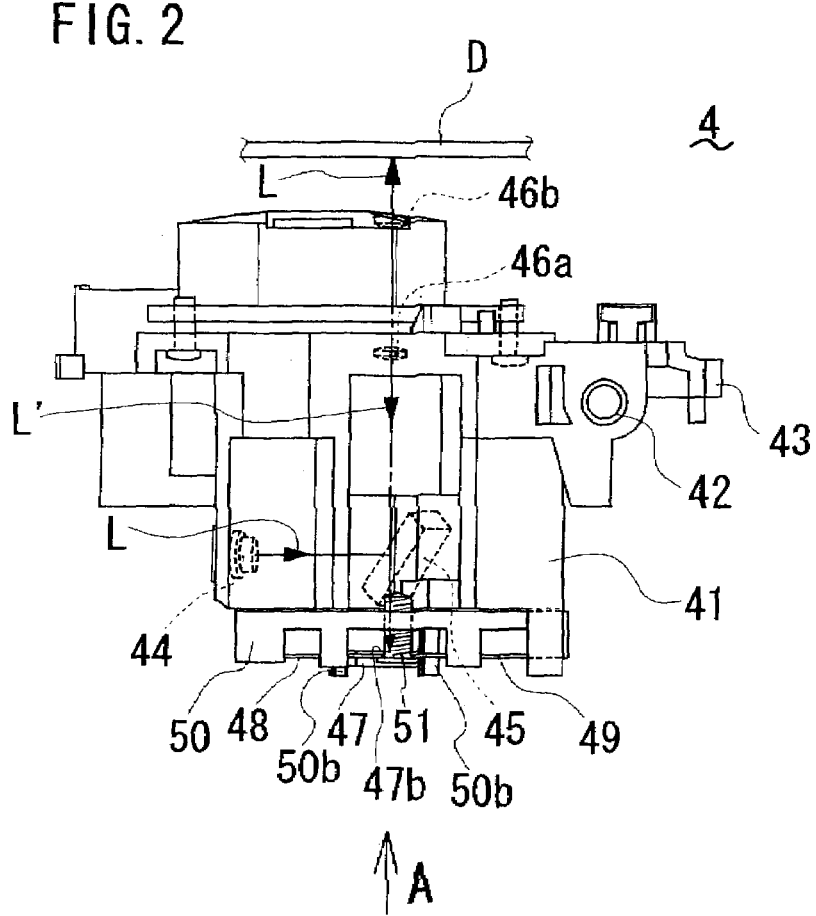
FIG. 2 is a side view of the optical pickup device with the defocus adjustor in accordance with an embodiment of the present invention.
Figure 5:
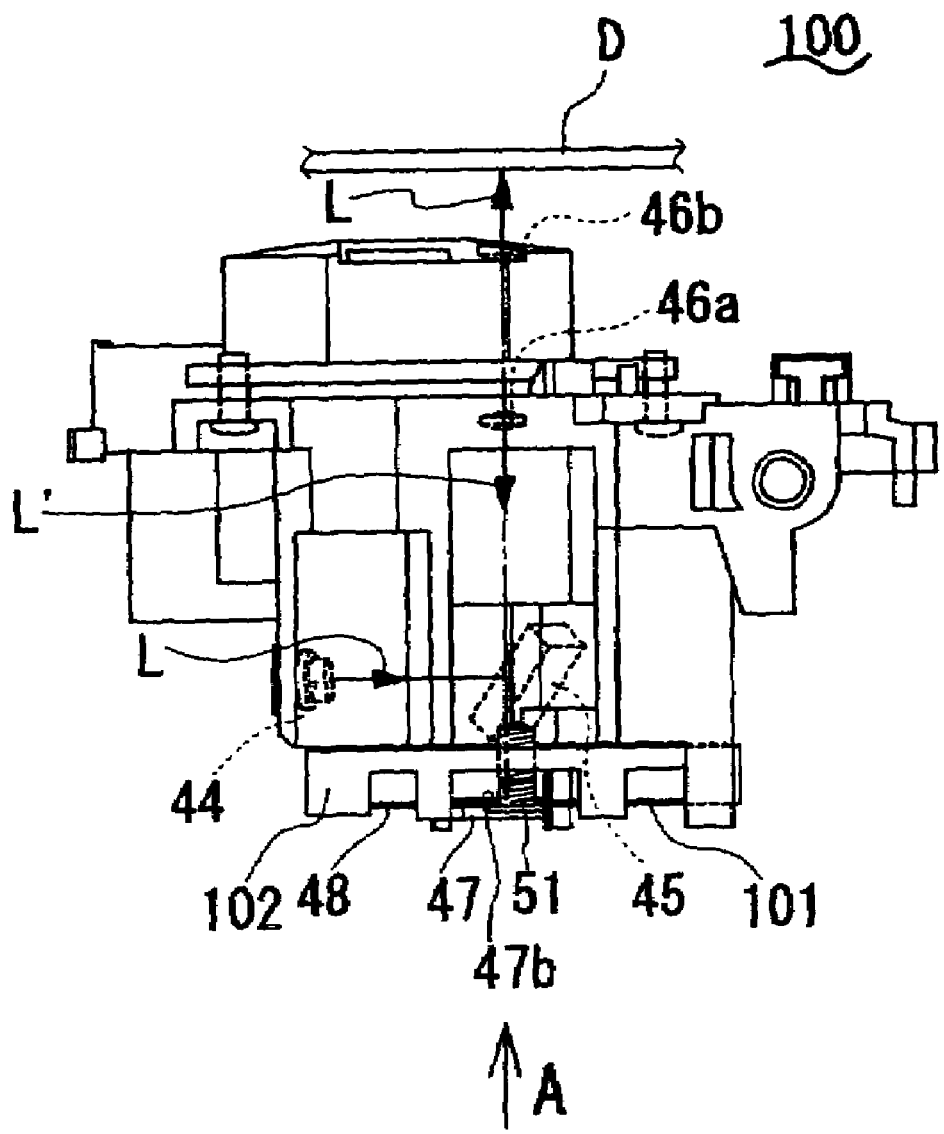
FIG. 5 is a side view of an optical pickup device which has been proposed by applicant.
Figure 6B:
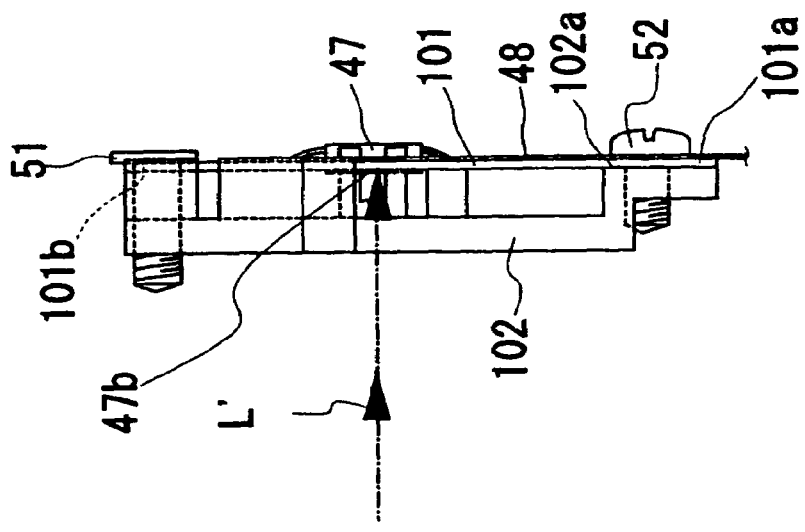
FIG. 6B is a side view of the optical pickup device proposed by the applicant observed in a direction shown by arrow B in FIG. 6A.
Figure 6A:
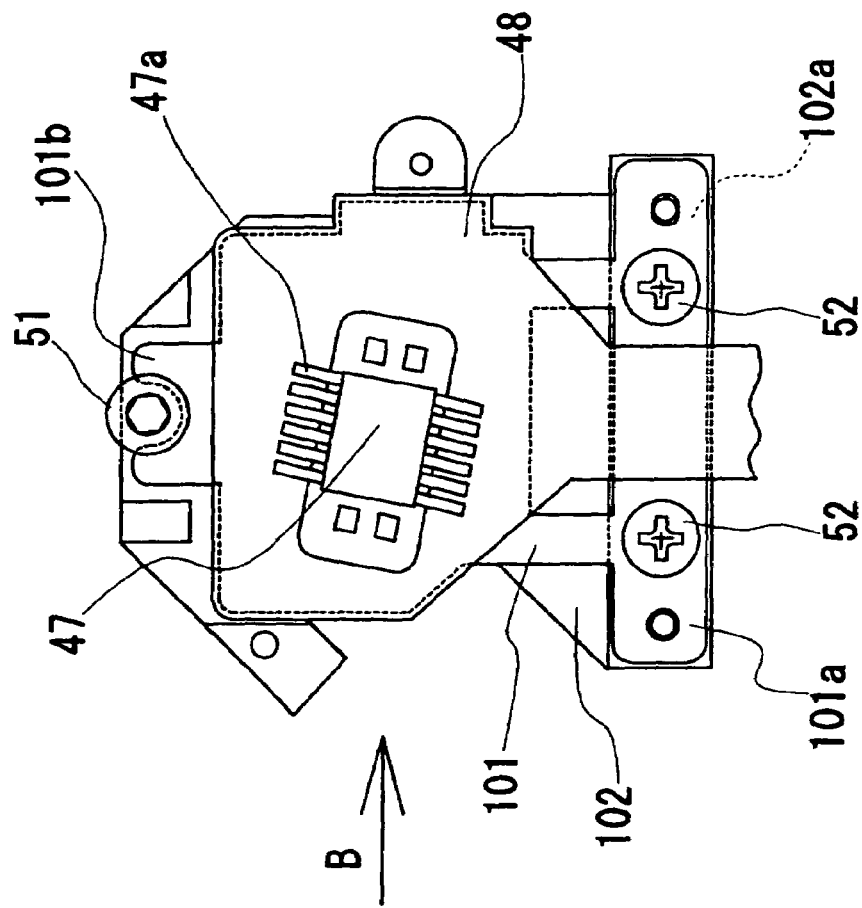
FIG. 6A is a bottom view of the optical pickup device proposed by the applicant observed in a direction shown by arrow A in FIG. 5.
Figure 7A:
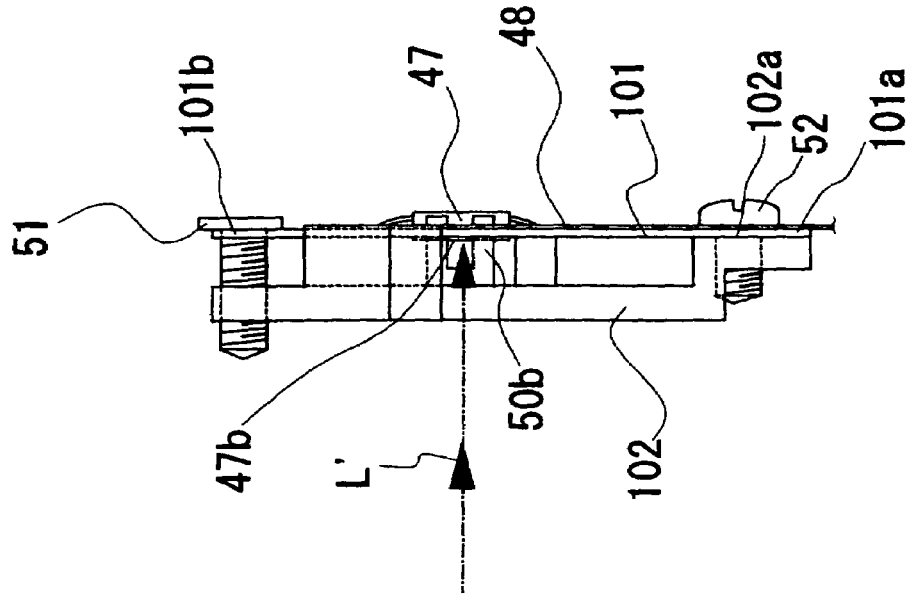
FIG. 7A is a side view of the optical pickup device proposed by the applicant before adjusting defocus of a photo-sensor.
Figure 7B:
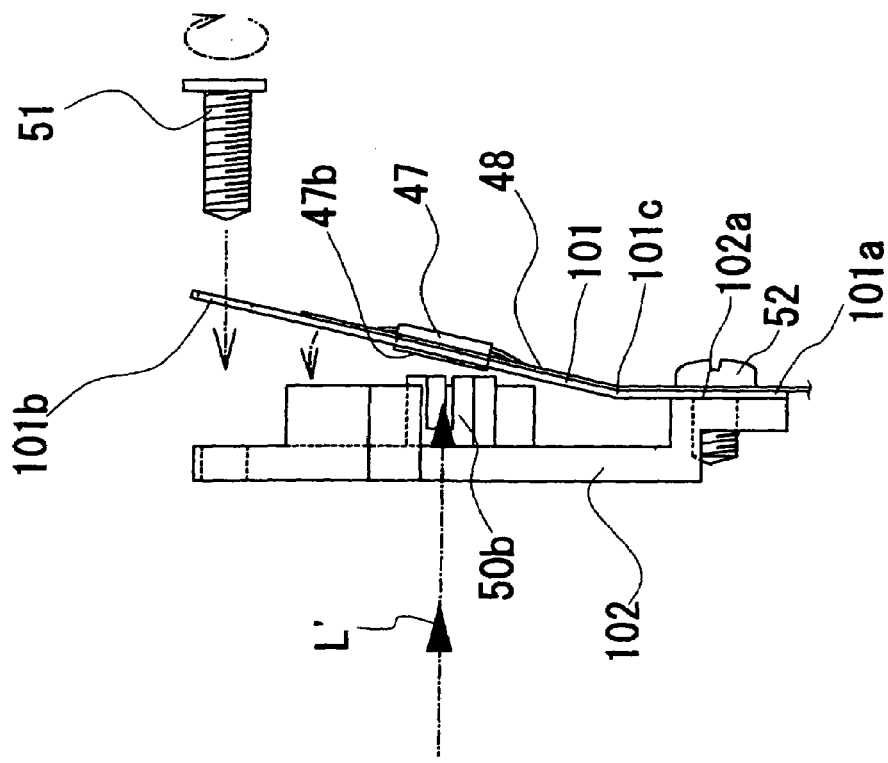
FIG. 7B is a side view of the optical pickup device proposed by the applicant after adjusting the defocus of the photo-sensor.

FIG. 2 shows a side view of the optical pickup device 4. In comparison with FIG. 2 and FIG. 5, they have substantially the same configuration but the defocus adjustor. The optical pickup device 4 has a laser diode 44 for emitting a laser beam L, a half mirror 45 for reflecting the laser beam L emitted from the laser diode 44 toward the optical disc D, a collimator lens 46a for expanding a diameter of the laser beam L and for converting the laser beam L to a parallel beam, a focusing lens 46b for focusing the laser beam L reflected by the half mirror 45 on a data recording face of the optical disc D, and a photo-sensor 47 for sensing the reflected laser beam L' reflected by the data recording face of the optical disc D and for converting the reflected laser beam L' to an electric signal. The half mirror 45 and the collimator lens 46a and the focusing lens 46b configure an optical system.

A base member 41 of the optical pickup device 4 has a bearing 42 through which a shaft held on a chassis of the optical disc driving apparatus 1 penetrates. A rack gear 43 for receiving a driving force is provided on the base member 41. Since the shaft is disposed in a direction parallel to the radial direction of the optical disc D, when a driving force is supplied to the rack gear 43, the base member 41 is moved along the shaft in the radial direction of the optical disc D.

FIG. 3A shows a bottom view of a defocus adjuster of the optical pickup device 4. FIG. 3B shows a side view of the defocus adjustor of the optical pickup device 4. The photo-sensor 47 is mounted on a flexible printed circuit board 48, and terminals 47a of the photo-sensor 47 are connected to wiring patterns printed on the flexible printed circuit board 48. The flexible printed circuit board 48 is bonded on a plate spring 49 so that a position of the photo-sensor 47 on the flexible printed circuit board 48 against the optical system can be adjusted.

Figure 4A:
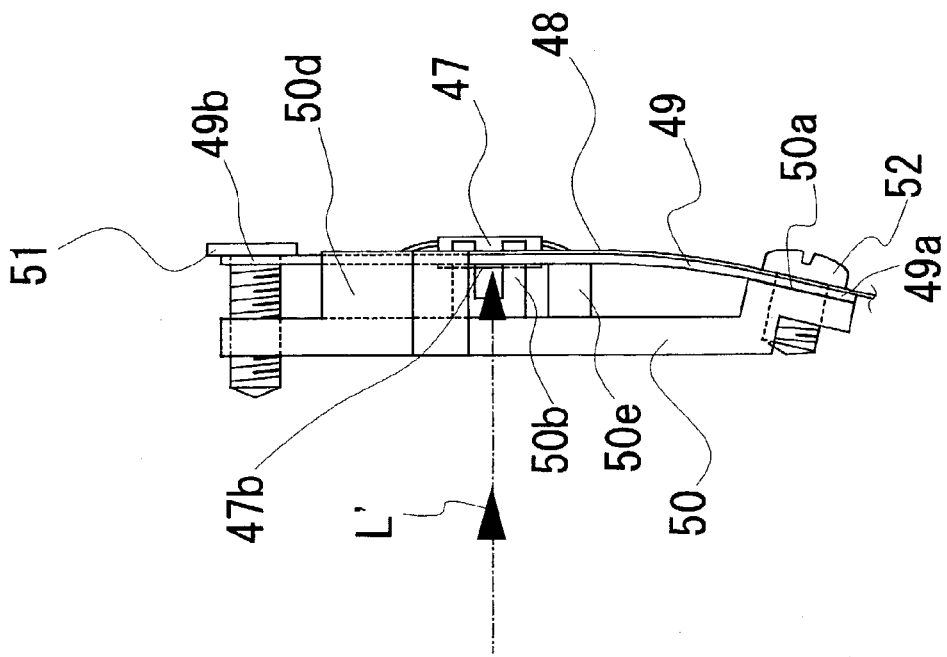
FIG. 4A is a side view of the defocus adjustor of the optical pickup device in accordance with the embodiment before adjusting defocus of a photo-sensor.
Figure 4B:
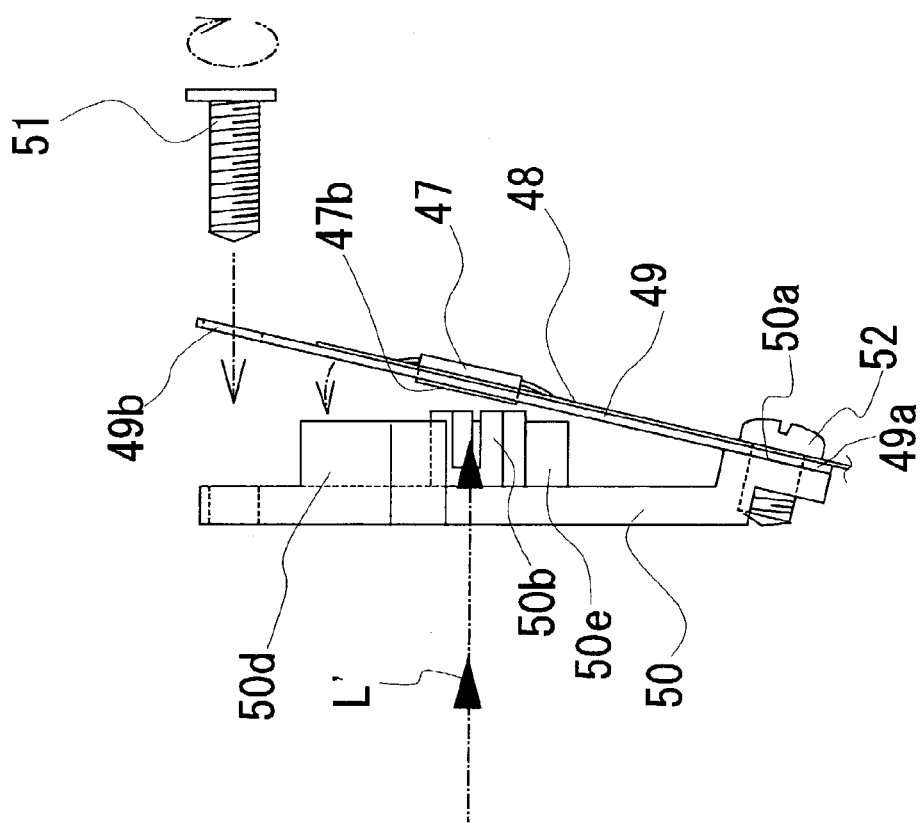
FIG. 4B is a side view of the defocus adjustor of the optical pickup device in accordance with the embodiment after adjusting the defocus of the photo-sensor.

An opening 49c is formed on the plate spring 49 at a position corresponding to the photo-sensor 47 through which the reflected laser beam L' passes. Similarly, an opening 48c is formed on the flexible printed circuit board 48. A first end 49a of the plate spring 49 is fixed on a fixing face 50a of a holder 50 by screws 52, and a second end 49b of the plate spring 49 is engaged with an adjusting screw 51 so that the second end 49b of the plate spring 49 is adjustably fixed on the holder 50. Thus, a height of the second end 49b of the plate spring 49 can be adjusted with respect to a predetermined standard face of the holder 50. The holder 50 has a plurality of guide spacers 50c, 50d and 50e which is provided so as not to contact the plate spring 49 with the flexible printed circuit substrate 48. Thus, the defocus adjustment of the photo-sensor 47 by warping the plate spring 49 is not disturbed by the guide spacers 50c, 50d and 50e. In FIGS. 4A and 4B, the guide spacer 50c is not illustrated for showing the adjusting screw 51 in detail. The guide spacers 50c, 50d and 50e are protruded above the flexible printed circuit substrate 48 on the plate spring 48, so that the plate spring 48 is guided by the guide spacers 50c, 50d and 50e so as not to contact with any element when the optical pickup device 4 is assembled into the optical disc driving apparatus 1. As a result, the defocus of the photo-sensor 47 may not be off.

The optical disc driving apparatus 1 further has a tracking servo mechanism and a focusing servo mechanism which are not illustrated in the drawings in detail. The tracking servo mechanism moves the position of the focusing lens 46b in the radial direction of the optical disc D so as to adjust the focused position of the laser beam L on a track on the data recording face of the optical disc D. The focusing servo mechanism moves the position of the focusing lens 46b in a direction perpendicular to the data recording face of the optical disc D so as to adjust the focused position of the laser beam L on the data recording face of the optical disc D. The defocus adjustor of the optical pickup device 4 in accordance with the present invention has no relation to the focusing servo mechanism.

The defocus adjustor of the optical pickup device 4 in accordance with this embodiment is configured by the plate spring 49 to which the flexible printed circuit board 48 is bonded by thermo compression, the holder 50 having the fixing face 50a on which the first end 49a of the plate spring 49 is fixed, and the adjusting screw 51. As mentioned above, the height of the second end 49b of the plate spring 49 can be adjusted with respect to a predetermined standard face of the holder 50 by tightening or loosening the adjusting screw 51. When the height of the second end 49b of the plate spring 49 is adjusted, the position and the inclination angle of a photo-sensing face 47b of the photo-sensor 47 against the reflected laser beam L' can be adjusted since the photo-sensor 47 is held on the plate spring 49 via the flexible printed circuit board 48.

FIGS. 4A and 4B show a configuration and principle of the defocus adjustor in this embodiment. As can be seen from FIG. 4A, the plate spring 49 is formed flat with no bending or warping portion by, for example, punching a metal thin plate. The flexible printed circuit board 48 is bonded on the plate spring 49 by a thermosetting adhesive tape and compressed by a thermo compression roller. In such thermo compression, the plate spring 49 has no bending portion, so that compressing force of the thermo compression roller is uniformly supplied to respective portions of the plate spring 49 and the flexible printed circuit board 48. Thus, the flexible printed circuit board 48 is firmly bonded on the plate spring 49.

The fixing face 50a of the holder 50 is inclined against the optical axis of the reflected laser beam L' for giving a predetermined inclination angle to the plate spring 49 with the flexible printed circuit board 48 when the first end 49a of the plate spring 49 is fixed on the fixing face 50a of the holder 50 by the screws 52, as shown in FIG. 4A. Subsequently, when the second end 49b of the plate spring 49 with the flexible printed circuit board 48 is adjustably fixed on the holder 50 by the adjusting screw 51, the plate spring 49 is warped as shown in FIG. 4B. The photo-sensing face 47b of the photo-sensor 47 becomes substantially perpendicular to the reflected laser beam L', which is a posture suitable for sensing the reflected laser beam L'. The plate spring 49 generates a stress against the tightening of the adjusting screw 51 so that a spring effect can be obtained when the defocus of the photo-sensor 47 against the optical system is adjusted. Thus, when the adjusting screw 51 is excessively tightened, the position and inclination of the photo-sensing surface 47b of the photo-sensor 47 can be restored so that the defocus of the photo-sensor 47 can be fine adjusted.

The photo-sensor 47 is temporarily fixed on the holder 50 through the flexible printed circuit board 48, the plate spring 49 and the adjusting screw 51 after adjusting the defocus. Thus, an adhesive is dropped between fixing guides 50b protruded from the holder 50 in the vicinity of a position at which the photo-sensor 47 faces and the photo-sensor 47 and the adhesive is hardened, so that the photo-sensor 47 is fixed on the holder 50.

In the optical pickup device 4 in this embodiment, the plate spring 49 is formed flat with no bending or warping portion in its natural state, so that no press working for bending the plate spring 49 in a predetermined angle is necessary, and the dimensions of the plate spring 49 can be made stable. Thus, the stress generated by the plate spring 49 against the tightening of the adjusting screw 51 can also be made stable. As a result, the defocus of the photo-sensor 47 against the optical system can easily and quickly be adjusted. The defocus adjusting operation of the optical pickup device 4 in mass production can be made effective. Furthermore, the plate spring 49 having no bending or warping portion may not disturb the thermo compression bonding by the thermo compression roller, so that the flexible printed circuit board 48 is firmly bonded on the plate spring 49.

The present invention is not restricted by the above-mentioned embodiment, so that it is possible to modify the configuration of the optical pickup device into various manners. In the above-mentioned the optical system of the optical pickup device 4 shown in FIG. 2 is configured by the half mirror 45, the collimator lens 46a and the focusing lens 46b can be modified that the laser beam L emitted from the laser diode 44 is directly irradiated on the optical disc D through the collimator lens 46a and the focusing lens 46b, and the reflected laser beam L' is reflected toward the photo-sensor 47 through the half mirror 45.

Furthermore, the bonding of the flexible printed circuit board 48 on the plate spring 49 is not restricted by the thermo compression bonding, so that another bonding method can be used for bonding the flexible printed circuit board 48 on the plate spring 49.

Still furthermore, the laser light source is not restricted by the laser diode 44, so that another light source having substantially the same characteristics can be used.

This application is based on Japanese patent application 2001-397746 filed in Japan dated Dec. 27, 2001, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An optical pickup device with a defocus adjustor comprising: a laser light source for emitting a laser beam; an optical system including a focusing lens for focusing the laser beam emitted from the laser light source on a data recording face of an optical disc; a photo-sensor for sensing a reflected laser beam reflected by the data recording face of the optical disc and for converting the reflected laser beam to an electric signal; a flexible printed circuit board on which the photo-sensor is mounted and having wiring patterns to which terminals of the photo-sensor are connected; a plate spring to which the flexible printed circuit board is fixed for adjusting a position of the photo-sensor against the optical system; a holder on which a first end of the plate spring is fixed; and an adjusting screw engaged with a second end of the plate spring and adjustably fixed on the holder; wherein
the adjusting screw is tightened or loosened for adjusting a posture of the plate spring with the flexible printed circuit board with respect to the holder, so that a position of a photo-sensing surface of the photo-sensor against the optical system and an inclination of the photo-sensing surface against an optical axis of a reflected laser beam can be fine adjusted;
the plate spring is formed flat with no bending portion, and warped after fixing the first end and the second end of the plate spring on the holder;
a fixing face of the holder is inclined against the optical axis of the reflected laser beam for giving a predetermined inclination angle to the plate spring with the flexible printed circuit board when the first end the plate spring is fixed on the fixing face of the holder;
when the second end of the plate spring with the flexible printed circuit board is fixed on the holder by the adjusting screw, the plate spring is warped for generating a stress so that a spring effect can be obtained when the defocus of the photo-sensor against the optical system is adjusted.

2. The optical pickup device in accordance with claim 1, wherein the flexible printed circuit board is bonded on the plate spring by thermo compression.

3. The optical pickup device with the defocus adjustor in accordance with claim 1, wherein at least a fixing guide is formed on the holder in the vicinity of a position at which the photo-sensor faces and the photo-sensor is adhered to the fixing guide by an adhesive after adjusting the position of the photo-sensor by tightening or loosening the adjusting screw.

4. The optical pickup device with the defocus adjustor in accordance with claim 1, wherein the optical system has a half mirror for reflecting the laser beam emitted from the laser light source toward the optical disc, a collimator lens for expanding a diameter of the laser beam and for converting the laser beam to a parallel beam, and a focusing lens for focusing the laser beam reflected by the half mirror on the data recoding face of the optical disc.

5. The optical pickup device with the defocus adjustor in accordance with claim 1, wherein the laser light source is a laser diode.

6. An optical disc driving apparatus comprising: a disc driving mechanism for rotating an optical disc; an optical pickup device for recording and/or reproducing data into and/or from a data recording face of the optical disc; and wherein the optical pickup device has a defocus adjustor and further comprises: a laser light source for emitting a laser beam; an optical system including a focusing lens for focusing the laser beam emitted from the laser light source on the data recording face of the optical disc; a photo-sensor for sensing a reflected laser beam reflected by the data recording face of the optical disc and for converting the reflected laser beam to an electric signal; a flexible printed circuit board on which the photo-sensor is mounted and having wiring patterns to which terminals of the photo-sensor are connected; a plate spring to which the flexible printed circuit board is fixed for adjusting a position of the photo-sensor against the optical system; a holder on which a first end of the plate spring is fixed; and an adjusting screw engaged with a second end of the plate spring and adjustably fixed on the holder; wherein the adjusting screw is tightened or loosened for adjusting the posture of the plate spring with the flexible printed circuit board with respect to the holder, so that a position of a photo-sensing surface of the photo-sensor against the optical system and an inclination of the photo-sensing surface against an optical axis of a reflected laser beam can be fine adjusted;

the plate spring is formed flat with no bending portion, and warped after fixing the first end and the second end of the plate spring on the holder;

a fixing face of the holder is inclined against the optical axis of the reflected laser beam for giving a predetermined inclination angle to the plate spring with the flexible printed circuit board when the first end the plate spring is fixed on the fixing face of the holder;

when the second end of the plate spring with the flexible printed circuit board is fixed on the holder by the adjusting screw, the plate spring is warped for generating a stress so that a spring effect can be obtained when the defocus of the photo-sensor against the optical system is adjusted.

* * * * *